United States Patent

Masubuchi et al.

(10) Patent No.: US 6,720,986 B2
(45) Date of Patent: Apr. 13, 2004

(54) OPTICAL PRINTER DEVICE THAT FORMS COLOR IMAGES

(75) Inventors: Sadao Masubuchi, Chofu (JP); Hideyuki Kawashima, Higashikurume (JP); Masafumi Yokoyama, Tokyo (JP); Masaaki Matsunaga, Tokyo (JP); Akira Shiota, Saitama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 09/972,871

(22) Filed: Oct. 10, 2001

(65) Prior Publication Data

US 2002/0044194 A1 Apr. 18, 2002

(30) Foreign Application Priority Data

Oct. 16, 2000 (JP) ........................................ 2000-314780

(51) Int. Cl.[7] ................................................ B41J 27/00
(52) U.S. Cl. ...................................... 347/241; 347/256
(58) Field of Search ................................ 347/238, 232, 347/233, 241, 242, 244, 245, 256; 369/121

(56) References Cited

U.S. PATENT DOCUMENTS 5,444,520 A * 8/1995 Murano ..................... 347/244
5,712,674 A * 1/1998 Doi ........................... 347/238
6,249,502 B1 * 6/2001 Mushiake ................... 369/121
6,549,226 B1 * 4/2003 Shimizu et al. ............ 347/241

FOREIGN PATENT DOCUMENTS

| EP | 0 831 640 | | 3/1998 | |
|---|---|---|---|---|
| JP | 63-189264 | * | 8/1988 | ............. B41J/3/21 |
| JP | 7-306481 | | 11/1995 | |
| JP | 2000-158709 | * | 6/2000 | ............ B41J/2/445 |

OTHER PUBLICATIONS

Patent Abstracts of Japan, Publication No. 56140319, Publication Date Feb. 11, 1981; Application No. 55043881, Application Date Mar. 4, 1980.

* cited by examiner

*Primary Examiner*—Hai Pham
(74) *Attorney, Agent, or Firm*—Smith, Gambrell & Russell, LLP (57) ABSTRACT

An optical printer device which includes an exposure device which makes relative movements, in a predetermined direction, with respect to a photosensitive body. The optical printer also has a plurality of first, second and third light-emitting elements which emit lights of a first, second and third colors. These light-emitting elements are mounted on a first, second and third mounting substrates, independent of one another, which correspond to the first, second and third colors.

18 Claims, 6 Drawing Sheets

OPTICAL PRINTER DEVICE THAT FORMS COLOR IMAGES

BACKGROUND OF THE INVENTION

1. Field of the Invention

The present invention relates to an optical printer device that forms color images by converting electrical signals to color optical signals.

2. Description of the Related Art

A video printer is a printer that prints images, which have been digitally processed and which are shown on a display, on a sheet. Known printing methods, which are adopted for video printers, include the thermal method, inkjet method, laser-beam scanning method and the liquid-crystal shutter method. Among such methods, the liquid-crystal shutter method is suitable for the purposes of obtaining a very small and lightweight device.

An optical printer device having a liquid-crystal shutter according to prior art is described below using FIGS. 7 to 9.

Figure 7:
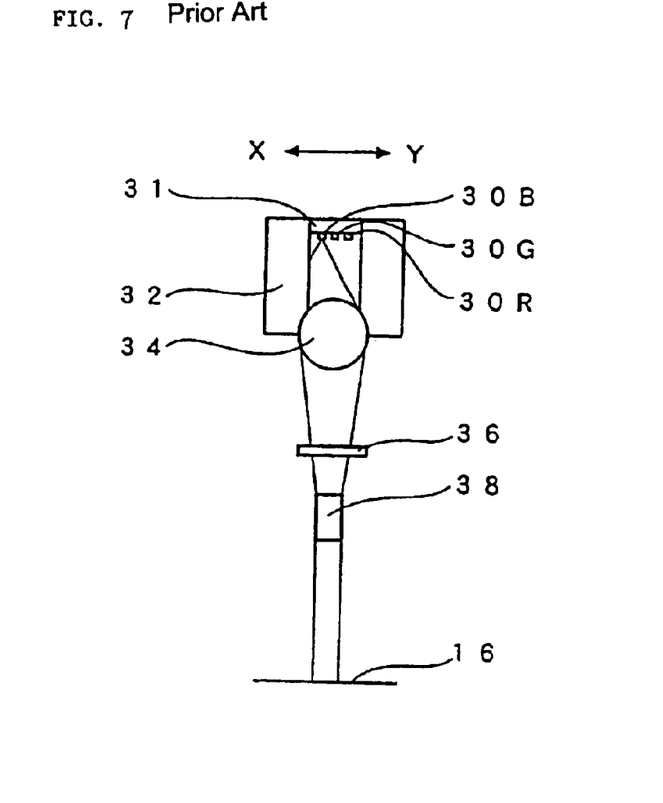
FIG. 7 is a cross-sectional view of a light-source unit in the optical printer device according to the prior art.

As shown in FIG. 7, a light-source unit for this video printer comprises a pair of members 32, which are each arranged facing one another at a predetermined interval in a horizontal direction (the X-Y direction in FIG. 7). A support member 31 is suspended between these members 32 such that the upper end of the hollow portion, which is formed between members 32, is occupied by this support member 31.

The lengthwise direction of support member 31 (a direction perpendicular to the surface of the paper of FIG. 7) corresponds to the direction of a single line on a photosensitive member 16. A plurality of light-emitting elements are arranged on the lower face of support member 31. Light-emitting diodes (hereinafter referred to as LEDs) are used for these light-emitting elements. These light-emitting elements (LEDs) are described hereinbelow by referring to FIG. 8.

Figure 8:
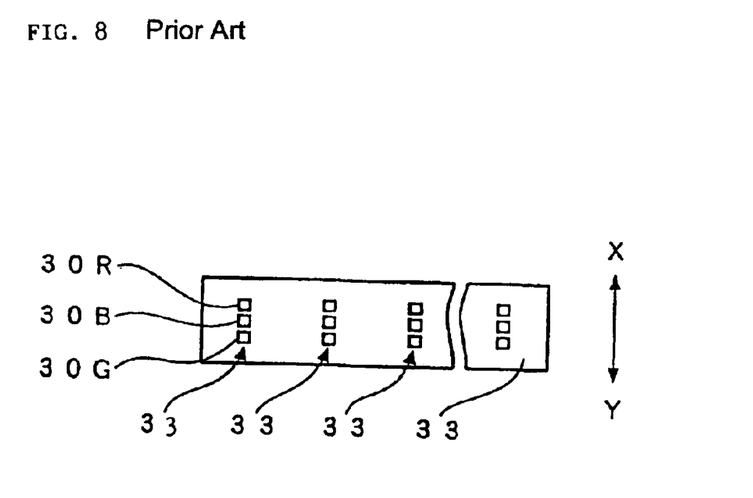
FIG. 8 is a figure showing the arrangement of LEDs provided in the light-source unit of FIG. 7.

As shown in FIG. 8, an R light (red light) LED 30R, B light (blue light) LED 30B and G light (green light) LED 30G are provided close to one another in a direction (X-Y direction) that is orthogonal to the single-line direction of photosensitive material 16. Light-emitting element groups 33 are constituted by these LEDs 30R, 30G, 30B, which are aligned to form one row in the X-Y direction of FIG. 8. A plurality of light-emitting element groups 33 are arranged at a predetermined pitch (normally on the order of about 3 mm) in the single-line direction of photosensitive material 16 (a direction perpendicular to X-Y of FIG. 8).

As shown in FIG. 7, a cylindrical lens 34 is mounted at the lower end of the above-mentioned hollow portion that is formed by the pair of members 32. Further, below this cylindrical lens 34, a liquid-crystal optical shutter array 36 is provided as a optical shutter array.

Next, control of liquid-crystal optical shutter array 36 will be described using FIG. 9. For the sake of convenience in the description, the single line of photosensitive material 16 will be considered to correspond to one pixel column that comprises five pixels. Consequently, one liquid-crystal cell column of liquid-crystal shutter array 36 comprises five liquid-crystal cells. This liquid-crystal array 36 comprises four liquid-crystal cell columns arranged in a direction that is orthogonal (in the X-Y direction) to the single-line direction of these liquid-crystal cell columns. In other words, liquid-crystal shutter array 36 comprises twenty liquid-crystal cells, which are arranged in five columns and four rows. Hereinbelow, a liquid-crystal cell in column i (i=1 to 5) and row j (j=1 to 4) is represented by 36SRij. Further, in FIG. 9, liquid-crystal cells 36Sij, through which R light, which is emitted from LED30R, is transmitted, are distinguished using oblique lines.

Figure 9:
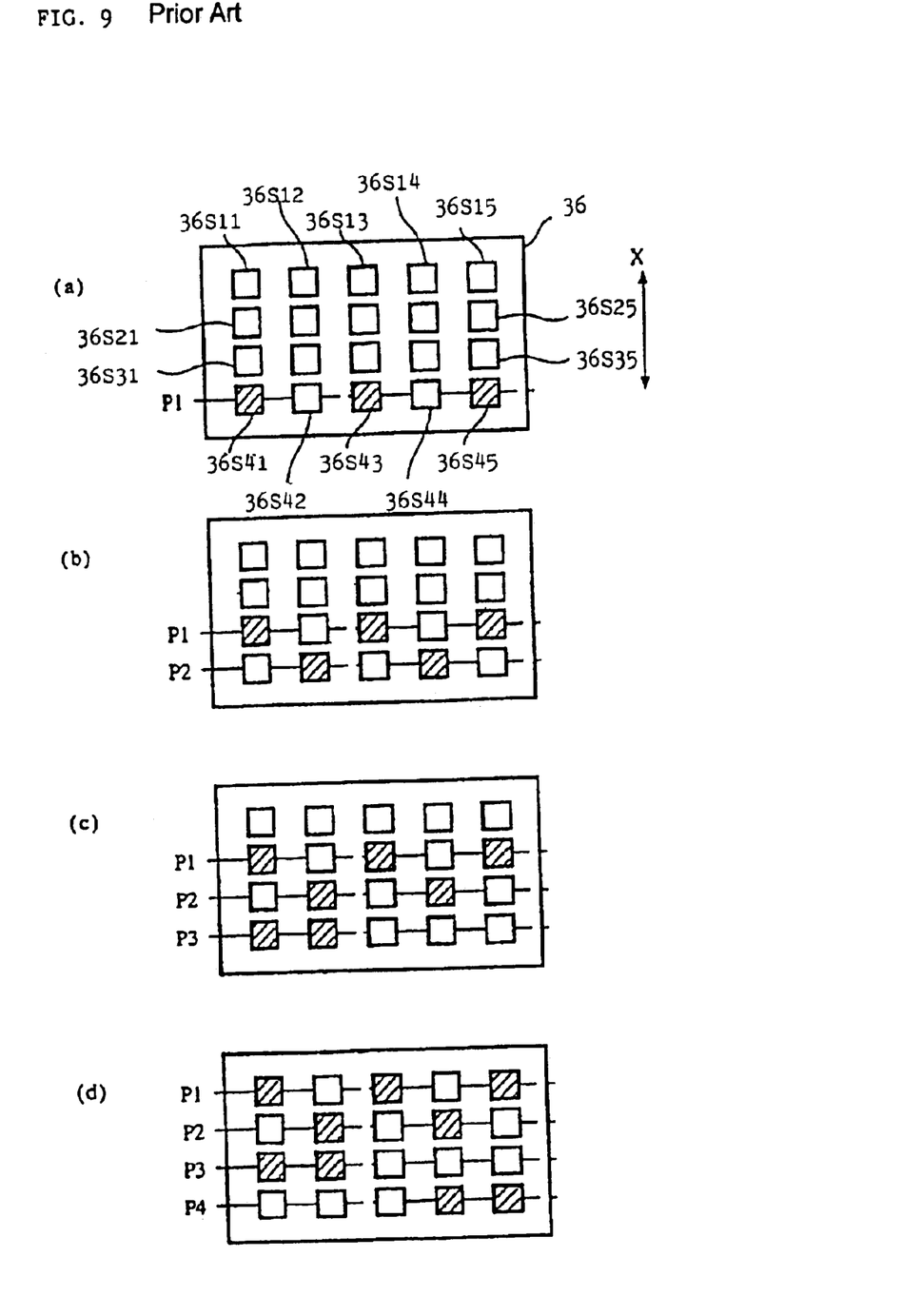
FIG. 9 is a figure illustrating control of the liquid-crystal optical shutter array provided in the light-source unit of FIG. 7.

When transportation of photosensitive material 16 begins such that the first single line is exposed, as shown in FIG. 9(a), liquid-crystal cells 36S41, 36S43, 36S45, which are in the fourth liquid-crystal cell column (liquid-crystal cells 36S41 to 36S45), are open (pattern P1). Then, after this line exposure using G light and B light is complete, same having been emitted from LEDs 30G and 30B, respectively, a transport roller (not shown in the figure) is driven to transport photosensitive material 16 by a distance of one line in the X direction of FIG. 9.

Then, when photosensitive material 16 is exposed by R light, which is emitted for a second time from LED30R, as shown in FIG. 9(b), liquid-crystal cells 36S31, 36S33, 36S35 in the third liquid-crystal cell column (liquid-crystal cells 36S31 to 36S35) are open on the basis of a pattern P1, and liquid-crystal cells 36S42, 36S44 in the fourth liquid-crystal cell column are open on the basis of a pattern P2.

As described hereinabove, in the above-mentioned technique, R-light LEDs, B-light LEDs and G-light LEDs on support member 31 are each fixed in a predetermined column and predetermined row. As a result, when displacement occurs, of the positions of R light, B light and G light on photosensitive material 16, from these predetermined positions, since no adjustment is possible of the corresponding mount positions of R-light LEDs, B-light LEDs and G-light LEDs on support member 31, positions of R light, B light and G light cannot be matched with these predetermined positions.

In addition, due to the fact that exposure of photosensitive material 16 is performed one line at a time, there is a problem in that the image-formation speed is low.

SUMMARY OF THE INVENTION

In accordance with an aspect of the present invention, an optical printer of the present invention has an exposure device which makes relative movement in a predetermined direction with respect to a photosensitive body.

The exposure device comprises a first mounting substrate for mounting a plurality of first light-emitting elements which emit light of a first color, a second mounting substrate for mounting a plurality of second light-emitting elements which emit light of a second color, and a third mounting substrate for mounting a plurality of third light-emitting elements which emit light of a third color, in addition to a frame.

The exposure device further comprises an optical shutter which controls the passage of the light from the first, second and third light-emitting elements to change the amount of irradiation onto the photosensitive body.

The first, second and third mounting substrates are configured independent of one another, respectively, and are attached to the frame.

BRIEF DESCRIPTION OF THE DRAWINGS

The above-mentioned object, and further objects and characteristics of the present invention will become evident from the description of the embodiment provided hereinbelow through reference to the attached figures, in which.

DESCRIPTION OF THE PREFERRED EMBODIMENTS

Figure 1:
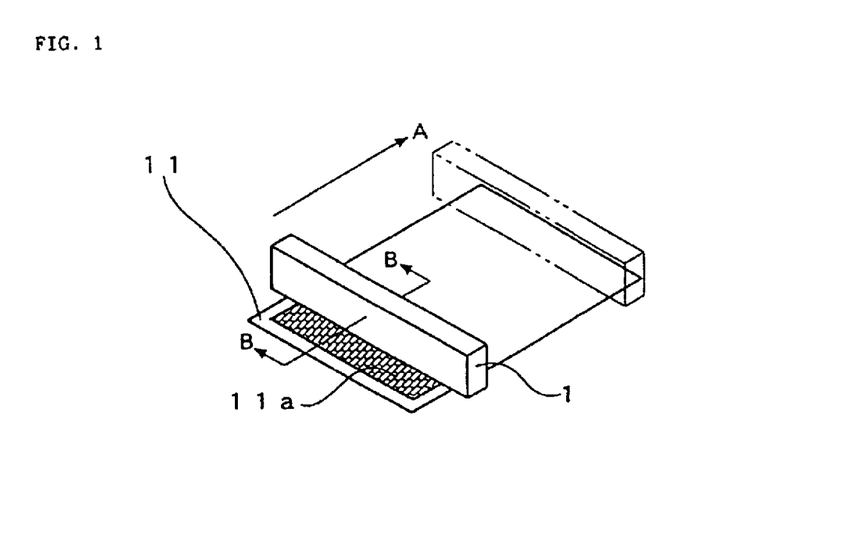
FIG. 1 is a perspective view that provides an overview of movement by the optical printer device according to the present invention.

The optical printer device prints an image 11a on the surface of a photosensitive medium 11 through exposure of a photosensitive medium 11 while an exposure device (print head) 1 is caused to move in the direction, as shown in FIG. 1, of the arrow A.

The structure of exposure device 1 will now be described by referring to FIG. 2.

The light-source substrate 3 is mounted at the top of the inner wall of outer casing 2 of exposure device 1. This light-source substrate 3 is of a breadth so as to cover a top portion of an inner wall face which is on the leading side with respect to the movement direction of exposure device 1, the upper inner wall face, and also a top portion of an inner wall face which is on the trailing side with respect to the movement direction of exposure device 1, which inner wall faces are in outer casing 2. Further, substrates on this light-source substrate are mounted, namely: R substrate 4a (a first mounting substrate) on a portion that covers the inner wall face of outer casing 2 on the leading side, G substrate 4b (a second mounting substrate) on a portion that covers the upper inner wall face, and B substrate 4c (a third mounting substrate) on a portion that covers the inner wall face on the trailing side, such that the respective mount positions of these substrates are adjustable.

A plurality of R light-emitting elements 5a (first light-emitting elements), a plurality of G light-emitting elements 5b (second light-emitting elements) and a plurality of B light-emitting elements 5c (third light-emitting elements) are fixed on R substrate 4a, G substrate 4b and B substrate 4c, respectively, in a manner such that they are arranged in a direction that is orthogonal to the direction of movement of exposure device 1 (the direction indicated by arrow A in FIG. 1). These R light-emitting elements 5a, G light-emitting elements 5b and B light-emitting elements 5c constitute the light source of exposure device 1. These light-emitting elements 5a, 5b, 5c are LEDs (light-emitting diodes).

Components, which are mounted in the bottom section of the interior of outer casing 2, are: a liquid-crystal shutter 9, which is an optical shutter that permits and blocks the passage of light on the basis of electrical signals; and a lens array 10, which serves to condense light, which has passed through liquid-crystal shutter 9, such that this light is focussed on a photosensitive medium 11 (described hereinbelow).

A photosensitive medium 11 is disposed below exposure device 1 (outer casing 2). As described hereinabove, exposure device 1 causes the emission of light from a light source while moving along the upper face of photosensitive medium 11, and prints an image on the upper face of photosensitive medium 11 by appropriate blockage, using a liquid-crystal shutter 9, of light which is emitted by the light source.

The light source of exposure device 1 will now be described in detail using FIG. 3.

A plurality of spherical concave lenses are juxtaposed on R substrate 4a in a direction that is orthogonal to the direction of movement of exposure device 1 and reflect light from R light-emitting elements 5a as substantially parallel beams. An R scatter member 6a and R lens member 7a are arranged at the leading face, with respect to the direction of emission, of R light-emitting elements 5a. In addition, a reflector member 8a is disposed, at the leading face of R lens member 7a, which reflects R light Lr (light of a first color) emitted by R light-emitting elements 5a toward photosensitive medium 11.

A plurality of spherical concave lenses are juxtaposed on G substrate 4b in a direction that is orthogonal to the direction of movement of exposure device 1 and reflect light from G light-emitting elements 5b as substantially parallel beams. A G scatter member 6b and G lens member 7b are arranged at the leading face, with respect to the direction of emission, of G light-emitting elements 5b. G light Lg (light of a second color), which has passed through G lens member 7b, is oriented directly toward photosensitive medium 11.

A plurality of spherical concave lenses are juxtaposed on B substrate 4c in a direction that is orthogonal to the direction of movement of exposure device 1 and reflect light from B light-emitting elements 5c as substantially parallel beams. A B scatter member 6c and B lens member 7c are arranged at the leading face, with respect to the direction of emission, of B light-emitting elements 5c. In addition, a reflector member 8c is disposed, at the leading face of B lens member 7c, which reflects B light Lb (light of a third color) emitted by B light-emitting elements 5c toward photosensitive medium 11 (described hereinbelow).

The liquid-crystal shutter 9 shown in FIG. 2 will now be described in detail using FIG. 4.

The liquid-crystal shutter 9 is provided with two rows of R pixel shutters 9a in a direction that is orthogonal to the direction of movement of exposure device 1, with tow rows of G pixel shutters 9b adjacent to and parallel with the R pixel shutter rows, and further with two rows of B pixel shutters 9c adjacent to and parallel with the G pixel shutter rows.

These pixel shutters 9a, 9b, 9c are each constituted by a first pixel shutter row, in which a plurality of microshutters are arranged in a single row at a predetermined pitch; and a second pixel shutter row, in which a plurality of microshutters are arranged in a single row at the above-mentioned predetermined pitch and in positions half a pitch behind the respective positions of the above-mentioned first pixel shutter row.

R pixel shutters 9a are irradiated with R light Lr, G pixel shutters 9b are irradiated with G light Lg, and B pixel shutters 9c are irradiated with B light Lb.

Figure 2:
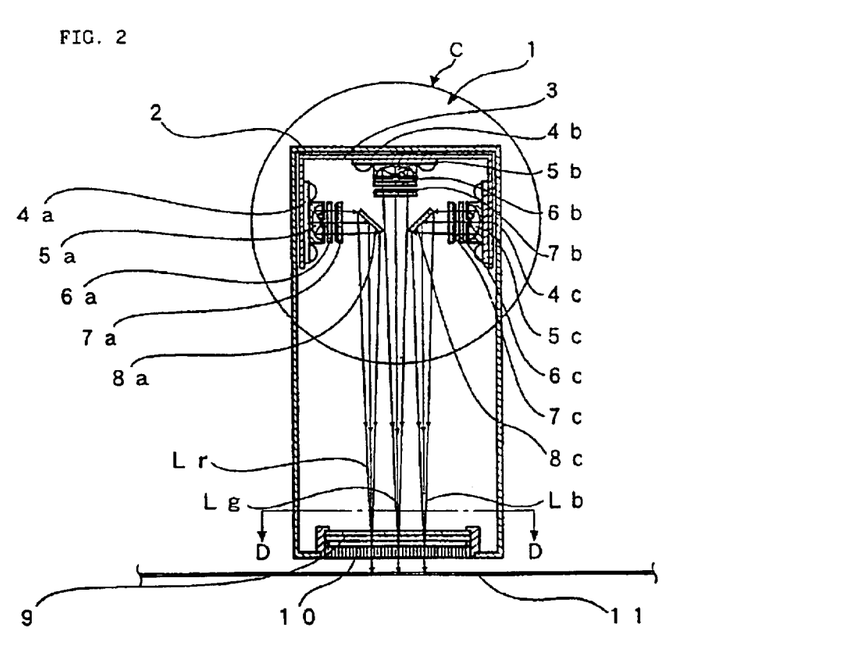
FIG. 2 is a cross-sectional view taken along line B—B in FIG. 1.
Figure 3:
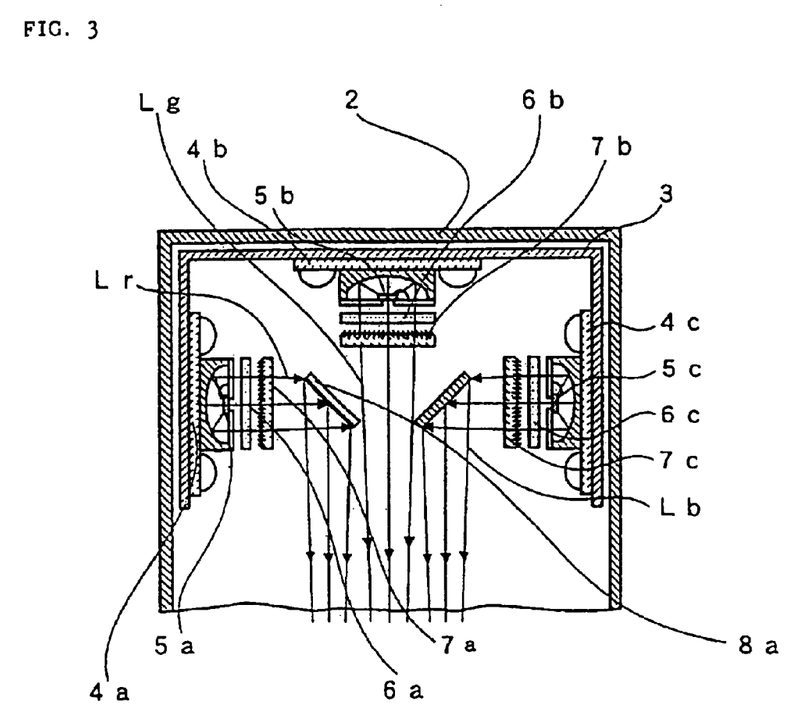
FIG. 3 is an enlarged view of the parts indicated by the circle C in FIG. 2.
Figure 4:
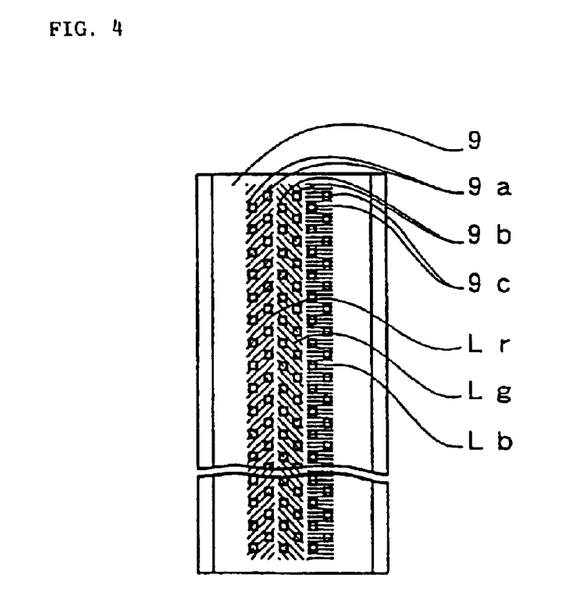
FIG. 4 is cross-sectional view taken along line D—D in FIG. 2.

Should one or several of the microshutters, which constitute R pixel shutters 9a shown in FIG. 4, is/are not irradiated with R light Lr from R light-emitting elements 5a shown in FIGS. 2 and 3, the mount position of R substrate 4a with respect to light-source substrate 3 is adjusted so that all of the microshutters, which constitute R pixel shutters 9a, are irradiated by R light Lr.

Similarly, should one or several of the plurality of microshutters, which constitute G pixel shutters 9b or B pixel shutters 9c is/are not irradiated with G light Lg or B light Lb from G light-emitting elements 5b or B light-emitting elements 5c, as a result of adjustment of the mount position of G substrate 4b or B substrate 4c with respect to light-source substrate 3 is adjusted so that all of the microshutters, which constitute G pixel shutters 9b or B pixel shutters 9c, are irradiated with G light Lg or B light Lb.

Figure 5:
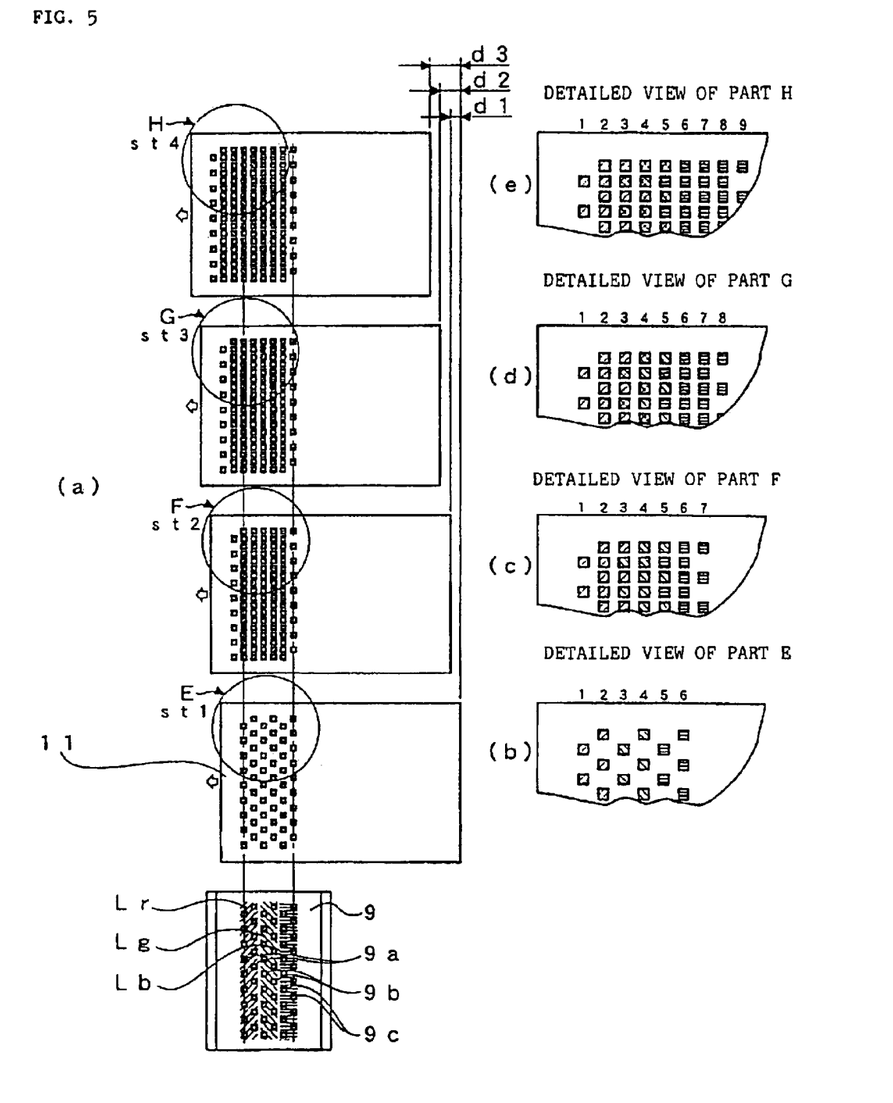
FIG. 5 is a figure illustrating a process in which a liquid-crystal shutter is used to form a color image on a photosensitive medium (stages 1 to 4 thereof).
Figure 6:
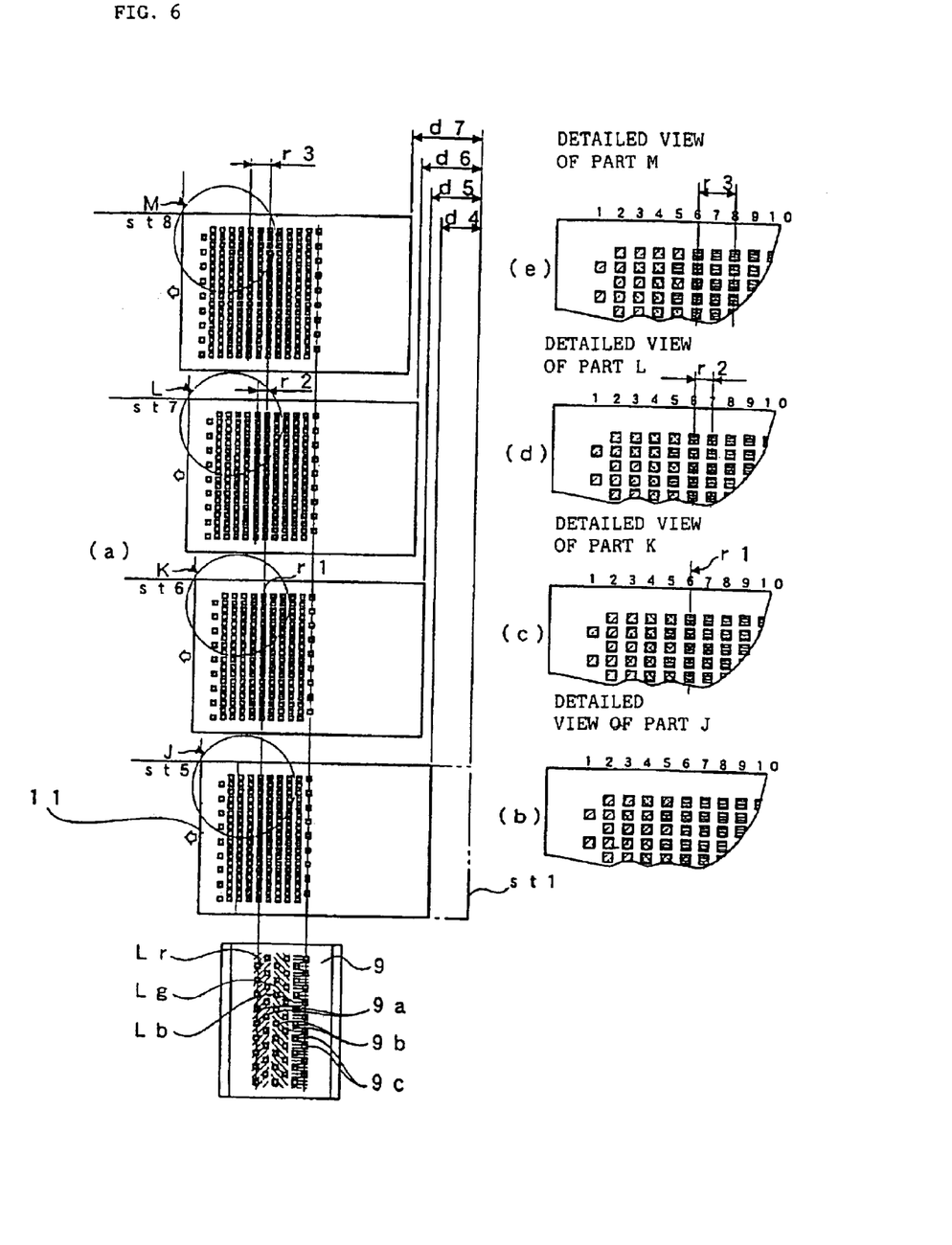
FIG. 6 is a figure illustrating a process that is a continuation of the process in FIG. 5 and in which a liquid-crystal shutter is used to form a color image on a photosensitive medium (stages 6 to 8 thereof).

A description will now follow, using FIGS. 5 and 6, of the process of forming a color image on photosensitive medium 11 by means of liquid-crystal shutter 9.

FIGS. 5(a) and 6(a) are figures that illustrate the process of forming an image on photosensitive medium 11 by means of liquid-crystal shutter 9, in association with change in the state of the photosensitive medium 11.

FIG. 5(a) serves to show the state of image formation at each stage (stage 1 (st1), stage 2 (st2), stage 3 (st3) and stage 4 (st4)) as photosensitive medium 11 is repeatedly caused to move by a distance that is equivalent to one pitch of a pixel shutter row (distance between the pixel shutter rows). FIGS. 5(b), 5(c), 5(d), and 5(e) are detailed views in which one part, of each of stages 1 through 4 shown in FIG. 5(a), has been enlarged. Further, numerical value i (=1 to 9), which is shown in FIGS. 5(b) to 5(e), represents the ith column, which is subjected to exposure, on photosensitive medium 11.

Further, FIG. 6(a) serves to show the state of image formation at stage 5 (st5), stage 6 (st6), stage 7 (st7) and stage 8 (st8), which succeed stage 4 (st4) of FIG. 5(a). FIGS. 6(b), 6(c), 6(d), and 6(e) are detailed views in which one part, of each of stages 5 through 8 shown in FIG. 6(a), has been enlarged. Further, numerical value i (=1 to 10), which is shown in FIGS. 6(b) to 6(e), represents the ith column, which is subjected to exposure, on photosensitive medium 11.

In FIG. 5(a), the number of microshutters constituting one pixel shutter row of liquid-crystal shutter 9 is nine. In actual fact, the number of microshutters constituting one pixel shutter row is greater than nine; however, here, in the interests of facilitating comprehension, a smaller number is taken.

As shown in FIG. 5(a), the two rows of R pixel shutters 9a, G pixel shutters 9b and B pixel shutters 9c, respectively, comprise a first pixel shutter row, for which nine microshutters are arranged in a single row at a predetermined pitch; and a second pixel shutter row, for which nine microshutters are arranged in a single row at the above-mentioned predetermined pitch and in positions half a pitch behind the respective positions of the above-mentioned first pixel shutter row.

R pixel shutters 9a are irradiated with R light Lr, G pixel shutters 9b are irradiated with G light Lg, and B pixel shutters 9c are irradiated with B light Lb.

Stage 1 (st1): R light-emitting elements 5a, G light-emitting elements 5b and B light-emitting elements 5c, which constitute the light source, emit light, and liquid-crystal shutters 9a, 9b, 9c transmit R light Lr, G light Lg, and B light Lb, whereby exposure of photosensitive medium 11 takes place. Specifically, here, in the interests of facilitating comprehension, when R light-emitting elements 5a, G light-emitting elements 5b and B light-emitting elements 5c emit light, all of the respective microshutters of R-light pixel shutters 9a, G-light pixel shutters 9b, and B-light pixel shutters 9c, of liquid-crystal shutter 9, are open (in actuality, the microshutters are opened selectively in accordance with the image to be exposed).

As shown in FIG. 5(b), in accordance with light emission by the light source, exposure of the first column and the second column is carried out with R light Lr in a manner such that the exposed points in the first column are displaced with respect to the exposed points in the second column by half a pitch in the column direction, and exposure of the third column and the fourth column is carried out with G light Lg in a manner such that the exposed points in the third column are displaced with respect to the exposed points in the fourth column by half a pitch in the column direction, and further, exposure of the fifth column and the sixth column is carried out with B light Lb in a manner such that the exposed points in the fifth column are displaced with respect to the exposed points in the sixth column by half a pitch in the column direction, Stage 2 (st2): After photosensitive medium 11 has been caused to move a distance d1, which is the same as the pitch of the pixel shutter rows, in the direction of the arrow (leftward in FIG. 5), similarly to stage 1 (st1), R light-emitting elements 5a, G light-emitting elements 5b and B light-emitting elements 5c emit light, and liquid-crystal shutters 9a, 9b, 9c transmit R light Lr, G light Lg, and B light Lb, whereby exposure of photosensitive medium 11 takes place. Here, all of the microshutters of each of liquid-crystal shutters 9a, 9b, 9c are open.

As shown in FIG. 5(c), in accordance with light emission by the light source, exposure of the second column and the third column is carried out with R light Lr in a manner such that the exposed points in the second column are displaced with respect to the exposed points in the third column by half a pitch in the column direction, and exposure of the fourth column and the fifth column is carried out with G light Lg in a manner such that the exposed points in the fourth column are displaced with respect to the exposed points in the fifth column by half a pitch in the column direction.

Consequently, as a result of two exposures in the above-mentioned stages 1 and 2, in which exposure is carried out in a manner such that the exposed points in a column are displaced with respect to the exposed points in an adjacent column by a half pitch in the column direction, exposed points ranging from the second column to the six column in the photosensitive medium 11 assumes the form of a matrix.

Stage 3 (st3): After photosensitive medium 11 has been caused to move a distance d2, which is equal to two times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the seven column in the photosensitive medium 11 assumes the form of a matrix, as shown in FIG. 5(d). Further, exposure of the third column and the fourth column is carried out with R light Lr in a manner such that the exposed points in the third column are displaced with respect to the exposed points in the fourth column by half a pitch in the column direction, exposure of the fifth column and the sixth column is carried out with G light Lg in a manner such that the exposed points in the fifth column are displaced with respect to the exposed points in the sixth column by half a pitch in the column direction, and exposure of the seventh column and the eighth column is carried out with B light Lb in a manner such that the exposed points in the seventh column are displaced with respect to the exposed points in the eighth column by half a pitch in the column direction.

Locations exposed at this stage overlap locations exposed at stage 1 (st1) with two rows shifted.

Stage 4 (st4): After photosensitive medium 11 has been caused to move a distance d3, which is equal to three times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the eighth column in the photosensitive medium 11 assumes the form of a matrix, as shown in FIG. 5(*e*). Further, exposure of the fourth column and the fifth column is carried out with R light Lr in a manner such that the exposed points in the fourth column are displaced with respect to the exposed points in the fifth column by half a pitch in the column direction, exposure of the sixth column and the seventh column is carried out with G light Lg in a manner such that the exposed points in the sixth column are displaced with respect to the exposed points in the seventh column by half a pitch in the column direction, and exposure of the eight column and the ninth column is carried out with B light Lb in a manner such that the exposed points in the eighth column are displaced with respect to the exposed points in the ninth column by half a pitch in the column direction.

Locations exposed at this stage overlap locations exposed at stage 2 (st2) with two rows shifted.

Stage 5 (st5): After photosensitive medium 11 has been caused to move a distance d4, which is equal to four times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the ninth column in the photosensitive medium 11 assumes the form of a matrix, as shown in FIG. 6(*b*). Further, exposure of the fifth column and the sixth column is carried out with R light Lr in a manner such that the exposed points in the fifth column are displaced with respect to the exposed points in the sixth column by half a pitch in the column direction, exposure of the seventh column and the eighth column is carried out with G light Lg in a manner such that the exposed points in the seventh column are displaced with respect to the exposed points in the eighth column by half a pitch in the column direction, and exposure of the ninth column and the tenth column is carried out with B light Lb in a manner such that the exposed points in the ninth column are displaced with respect to the exposed points in the tenth column by half a pitch in the column direction.

Locations exposed at this stage overlap locations exposed at stage 3 (st3) with two rows shifted.

Stage 6 (st6): After photosensitive medium 11 has been caused to move a distance d5, which is equal to five times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the tenth column in the photosensitive medium 11 assumes the form of a matrix, as shown in FIG. 6(*c*). Further, exposure of the sixth column and the seventh column is carried out with R light Lr in a manner such that the exposed points in the sixth column are displaced with respect to the exposed points in the seventh column by half a pitch in the column direction, exposure of the eighth column and the ninth column is carried out with G light Lg in a manner such that the exposed points in the eighth column are displaced with respect to the exposed points in the ninth column by half a pitch in the column direction, and exposure of the tenth column and the eleventh column is carried out with B light Lb in a manner such that the exposed points in the tenth column are displaced with respect to the exposed points in the eleventh column by half a pitch in the column direction.

Location exposed at this stage overlap locations exposed at stage 4 (st4) with two rows shifted.

As a result of the above sequential exposures prior to this stage, the sixth column, which is indicated by the reference symbol r1 in FIG. 6(*c*), is an exposed region in which R light Lr, G light Lg and B light Lb have blended together.

Stage 7 (st7): After photosensitive medium 11 has been caused to move a distance d6, which is equal to six times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the eleventh column in the photosensitive medium 11 assumes the form of a matrix, as shown in FIG. 6(*d*). Further, exposure of the seventh column and the eighth column is carried out with R light Lr in a manner such that the exposed points in the seventh column are displaced with respect to the exposed points in the eighth column by half a pitch in the column direction, exposure of the ninth column and the tenth column is carried out with G light Lg in a manner such that the exposed points in the ninth column are displaced with respect to the exposed points in the tenth column by half a pitch in the column direction, and exposure of the eleventh column and the twelfth column is carried out with B light Lb in a manner such that the exposed points in the eleventh column are displaced with respect to the exposed points in the twelfth column by half a pitch in the column direction.

Locations exposed at this stage overlap locations exposed at stage 5 (st5) by two rows.

As a result of the above sequential exposures prior to this stage, the sixth and seventh columns, which are indicated by the reference symbol r2 in FIG. 6(*d*), is an exposed region in which R light Lr, G light Lg and B light Lb have blended together.

Stage 8 (st8): After photosensitive medium 11 has been caused to move a distance d7, which is equal to seven times the pitch of the pixel shutter rows, from the position of stage 1, in the direction of the arrow, photosensitive medium 11 is exposed in the same manner as in the previous stage.

Consequently, as a result of exposures in which exposure is carried out in a manner such that the exposed points in a column are displaced with respect to the exposed points in an adjacent column by a half pitch in the column direction, exposed points ranging from the second column to the twelfth column in the photosensitive medium 11 assumes the form of a matrix, as shown in FIG. 6(e). Further, exposure of the eighth column and the ninth column is carried out with R light Lr in a manner such that the exposed points in the eighth column are displaced with respect to the exposed points in the ninth column by half a pitch in the column direction, exposure of the tenth column and the eleventh column is carried out with G light Lg in a manner such that the exposed points in the tenth column are displaced with respect to the exposed points in the eleventh column by half a pitch in the column direction, and exposure of the twelfth column and the thirteenth column is carried out with B light Lb in a manner such that the exposed points in the twelfth column are displaced with respect to the exposed points in the thirteenth column by half a pitch in the column direction.

Location exposed locations at this stage overlap locations exposed at stage 6 (st6) with two rows shifted.

As a result of the above sequential exposures prior to this stage, the sixth, seventh and eighth columns, which are indicated by the reference symbol r3 in FIG. 6(e), is an exposed region in which R light Lr, G light Lg and B light Lb have blended together.

As a result of the sequential exposure of photosensitive medium 11 in the manner described above, with the exception of the first five rows (the first row to the fifth row) and the last five rows, exposure takes place such that R light Lr, G light Lg and B light Lb blend together in the same region of photosensitive medium 11. Consequently, by placing a mask to cover the first five rows and last five rows of photosensitive medium 11, it is possible to perform full-color printing, for which R light, G light and B light are used, of the entire region not covered by the mask.

In the example above, a description was provided in which microshutters in the same pixel shutter row are all open concurrently. However, in actual fact, selective control of the opening and closure of the microshutters is performed such that only some of these microshutters are opened and the rest thereof remain closed, in accordance with the image to be formed on photosensitive medium 11.

As described hereinabove, according to the present invention, an R substrate 4a, whereon R light-emitting elements 5a are fixed, a G substrate 4b, whereon G light-emitting elements 5b are fixed, and a B substrate 4c, whereon B light-emitting elements 5c are fixed, are all mounted independently on light-source substrate 3 such that the mount position of each of these substrates is adjustable.

Consequently, in the event of displacement of R light with respect to R pixel shutters 9a, the correct passage of R light through R pixel shutters 9a, which light has been output from R light-emitting elements mounted on R substrate 4a, can be achieved by adjustment of the mount position of R substrate 4a with respect to light-source substrate 3. Similarly, in the event of displacement of G light with respect to G pixel shutters 9b, or of B light with respect to B pixel shutters 9c, the correct passage of G light, which has been output from G light-emitting elements mounted on G substrate 4b, or of B light, which has been output from B light-emitting elements mounted on B substrate 4c, through G pixel shutters 9b or B pixel shutters 9c, respectively, can be achieved by adjustment of the mount position of G substrate 4b or B substrate 4c, respectively, with respect to light-source substrate 3.

Moreover, according to the present invention, simultaneous exposure of a photosensitive medium by R light, G light and B light is possible while exercising control of a microshutter array in which each of the pixels are arranged in positions that are mutually displaced by half a pitch in the column direction, whereby a high-density image can be printed at high speed on a photosensitive medium.

What is claimed is:

1. An optical printer device comprising an exposure device which makes relative movements, in a predetermined direction, with respect to a photosensitive body, wherein said exposure device has:
   a frame;
   a first mounting substrate for mounting a plurality of first light-emitting elements which emit light of a first color, a second mounting substrate for mounting a plurality of second light-emitting elements which emit light of a second color, and a third mounting substrate for mounting a plurality of third light-emitting elements which emit light of a third color; and
   an optical shutter which controls the passage of the light from the first, second and third light-emitting elements to change the amount of irradiation onto the photosensitive body; and wherein
      the first, second and third mounting substrates are configured independent of one another, respectively, and are attached to said frame in a manner such that the mounting position of each of the mounting substrates to the frame can be changed independently so that the light emitted from the first, second and third light-emitting elements passes through designated regions of said optical shutter.

2. The optical printer device according to claim 1, wherein said first, second and third light-emitting elements are mounted in front of concave mirrors which are provided on the first, second and third mounting substrates, respectively.

3. The optical printer device according to claim 1, wherein the light emitted from the light-emitting element mounted on at least one of said first, second and third mounting substrates is irradiated in a direction orthogonal to the light emitted from the light-emitting elements mounted on the other two mounting substrates.

4. The optical printer device according to claim 1, wherein the light emitted from the light-emitting element mounted on at least one of said first, second and third mounting substrates is irradiated in a direction parallel to the direction of said relative movement, and then the light is reflected by a reflecting mirror so that the direction of the light is changed to be orthogonal to the direction of said relative movement, and then the light is incident to the optical shutter.

5. The optical printer device according to claim 1, wherein said optical shutter is provided with the first, second and third pixel shutters rows, each aligned in the direction orthogonal to the direction of said relative movement, and these first, second and third shutter rows control the passage of only the light of said first, second and third color, respectively.

6. The optical printer device according to claim 1, wherein said optical shutter is a liquid-crystal shutter.

7. The optical printer device according to claim 1, wherein said light-emitting elements are LED elements.

8. The optical printer device according to claim 1, wherein said light of the first, second and third colors is light that is respectively red, green and blue.

9. An optical printer device comprising an exposure device which makes relative movements, in a predetermined direction, with respect to a photosensitive body, wherein said exposure device has:
   a frame;

a first light source emitting a first light, a second light source emitting a second light and a third light source emitting a third light; and an optical shutter which controls the passage of the light emitted from the first, second and third light sources; wherein said optical shutter has at least three pixel rows, and the first pixel row allows the passage of only a light from the first light source, the second pixel row allows the passage of only a light from the second light source, and the third pixel row allows the passage of only a light from the third light source; and the first, second and third light sources are attached to the frame in a manner such that mounting positions of the first, second and third light sources are adjustable so that the light emitted from the first, second and third light sources passes through their respective pixel rows.

10. The optical printer device according to claim 9, wherein said first light source comprises a first mounting substrate on which a plurality of first light-emitting elements which emit a light of a first color are mounted, said second light source comprises a second mounting substrate on which a plurality of second light-emitting elements which emit a light of a second color are mounted and said third light source comprises a third mounting substrate on which a plurality of third light-emitting elements which emit a light of a third color are mounted, and further these first, second and third mounting substrates are attached to the frame, respectively, in a manner such that the attaching position thereof is adjustable.

11. The optical printer device according to claim 10, wherein said first, second and third light-emitting elements are arranged in front of concave mirrors which are provided on the first, second and third mounting substrates, respectively.

12. The optical printer device according to claim 10, wherein the light emitted from the light-emitting element mounted on at least one of said first, second and third mounting substrates is irradiated in a direction orthogonal to the light emitted from the light-emitting elements mounted on the other two mounting substrates.

13. The optical printer device according to claim 10, wherein the light emitted from the light-emitting element mounted on at least one of said first, second and third mounting substrates is irradiated in a direction parallel to the direction of said relative movement, and then converted by a reflecting mirror to a direction orthogonal to said direction of the relative movement to be incident to the optical shutter.

14. The optical printer device according to claim 10, wherein said light-emitting elements are LED elements.

15. The optical printer device according to claim 9, wherein said optical shutter is a liquid-crystal shutter.

16. An optical printer device comprising an exposure device which makes relative movements, in a predetermined direction, with respect to a photosensitive body, wherein said exposure device has:

a frame;

light sources, attached to the frame, which emit at least red, green and blue color; and a liquid-crystal optical shutter which controls the passage of the light emitted from said light sources; and wherein said light source has a red LED mounting substrate on which a plurality of red LEDs emitting a light of a red color are mounted, a green LED mounting substrate on which a plurality of green LEDs emitting a light of a green color are mounted, and a blue LED mounting substrate on which a plurality of blue LEDs emitting a light of a blue color are mounted;

said liquid-crystal optical shutter is provided with at least three pixel rows aligned in the direction orthogonal to the direction of said relative movement, and these pixel rows include a red pixel row which controls the passage of light of only red color, a green pixel row which controls the passage of light of only green color and a blue pixel row which controls the passage of light of only blue color; and said red LED mounting substrate, said green LED mounting substrate and said blue LED mounting substrate are attached to the frame in a manner such that the attaching positions thereof are adjustable so as to be capable of changing the light irradiation angle so that the lights of respective colors are incident to the corresponding pixel rows, respectively.

17. The optical printer device according to claim 16, wherein said red LEDs, green LEDs and blue LEDs are mounted on the red LED mounting substrate, green LED mounting substrate and blue LED mounting substrate through concave mirrors, respectively, and the lights emitted from these LEDs are reflected by the concave mirrors in the direction opposite to the corresponding mounting substrates, respectively.

18. The optical printer device according to claim 17, wherein, for at least two of the red LED mounting substrate, green LED mounting substrate and blue LED mounting substrate, the direction of the light reflected by the concave mirror is parallel to the direction of said relative movement, and then the direction of the light is changed to the direction orthogonal to the direction of said relative movement by a plane mirror, and the light whose direction has been changed is incident to said liquid-crystal optical shutter.

* * * * *